(12) United States Patent
Migita et al.

(10) Patent No.: US 8,198,767 B2
(45) Date of Patent: Jun. 12, 2012

(54) BUSBAR UNIT, MOTOR, AND POWER STEERING APPARATUS

(75) Inventors: Takayuki Migita, Kyoto (JP); Hiroshi Sambuichi, Kyoto (JP)

(73) Assignee: Nidec Corporation, Kyoto (JP)

(*) Notice: Subject to any disclaimer, the term of this patent is extended or adjusted under 35 U.S.C. 154(b) by 216 days.

(21) Appl. No.: 12/693,619

(22) Filed: Jan. 26, 2010

(65) Prior Publication Data

US 2010/0187923 A1 Jul. 29, 2010

(30) Foreign Application Priority Data

Jan. 27, 2009 (JP) ................. 2009-015842

(51) Int. Cl.
*H02K 11/00* (2006.01)
(52) U.S. Cl. ...................... 310/71; 310/68 R
(58) Field of Classification Search .............. 310/71, 310/68 R, 68 C
See application file for complete search history.

(56) References Cited

U.S. PATENT DOCUMENTS

| 6,993,829 | B2* | 2/2006 | Kobayashi et al. ........ 29/622 |
| 7,723,878 | B2* | 5/2010 | Yagai et al. ............... 310/71 |
| 2003/0173841 | A1 | 9/2003 | Kobayashi et al. |
| 2003/0173842 | A1* | 9/2003 | Kobayashi et al. ........ 310/71 |
| 2003/0201688 | A1* | 10/2003 | Yamamura et al. ........ 310/216 |
| 2007/0273221 | A1* | 11/2007 | Kinoshita et al. ......... 310/58 |
| 2008/0219867 | A1* | 9/2008 | Sakata ..................... 417/410.1 |

FOREIGN PATENT DOCUMENTS

JP 2002-300745 A 10/2002

* cited by examiner

*Primary Examiner* — Quyen Leung
*Assistant Examiner* — Naishadh Desai
(74) *Attorney, Agent, or Firm* — Keating & Bennett, LLP

(57) ABSTRACT

A busbar unit includes a plurality of busbars including a first busbar and a second busbar, an insulating holder in which each of the busbars is arranged, and an insulating member. The holder preferably includes a first groove portion including a first opening portion arranged to receive the first busbar, and a second groove portion arranged adjacent to the first groove portion and including a second opening portion arranged to receive the second busbar. The first busbar includes a first terminal arm portion arranged to extend across the second busbar, and the insulating member is arranged between the first terminal arm portion and the second busbar.

16 Claims, 12 Drawing Sheets

BUSBAR UNIT, MOTOR, AND POWER STEERING APPARATUS

BACKGROUND OF THE INVENTION

1. Field of the Invention

The present invention relates to a busbar unit, a motor, and a power steering apparatus.

2. Description of the Related Art

In the field of motors provided with busbars, motors having a holder including a plurality of busbars arranged on a side edge of their stator in order to achieve connection of a terminal of each coil are known.

The holder is made of an insulating material and formed in the shape of a doughnut. The holder includes a plurality of concentric groove portions. Each busbar is formed of a belt-shaped copper plate or the like, and is bent to assume the shape of a circular arc. Each busbar is inserted in a separate one of the groove portions of the holder. The busbar includes an arm portion extending in a radial direction. The arm portion of a busbar arranged radially inward in the holder is arranged to extend across a busbar arranged radially outward thereof.

Suppose, for example, that at a position where the busbars intersect with each other, the busbars are arranged to have only a little gap therebetween. In this case, application of a high voltage to the busbars may cause a spark discharge between the busbars, and if an unexpected external force bends the holder to change the shape of the busbars, a short circuit between the busbars may occur.

SUMMARY OF THE INVENTION

According to a preferred embodiment of the present invention, a busbar unit includes a plurality of busbars including a first busbar and a second busbar; an insulating holder in which each of the busbars is arranged; and an insulating member. The holder preferably includes a first groove portion having a first opening portion arranged to receive the first busbar, and a second groove portion arranged adjacent to the first groove portion and including a second opening portion arranged to receive the second busbar. The first busbar preferably includes a first terminal arm portion arranged to extend across the second busbar, and the insulating member is arranged between the first terminal arm portion and the second busbar.

This busbar unit according to a preferred embodiment of the present invention achieves improvements in insulation performance when compared to conventional busbar units as described above.

Other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the accompanying drawings. Note that the following description of the preferred embodiments is meant to be illustrative and not restrictive, and should not be construed to restrict the scope, applications, or purposes of the present invention. Also note that a longitudinal direction of a shaft 51 (shown, for example, in FIG. 2) and a direction parallel or substantially parallel to the longitudinal direction of the shaft 51 will be referred to as an axial direction, that a direction perpendicular or substantially perpendicular to the axial direction will be referred to as a radial direction, and that a direction in which the shaft 51 rotates will be referred to as a circumferential direction.

Figure 1:
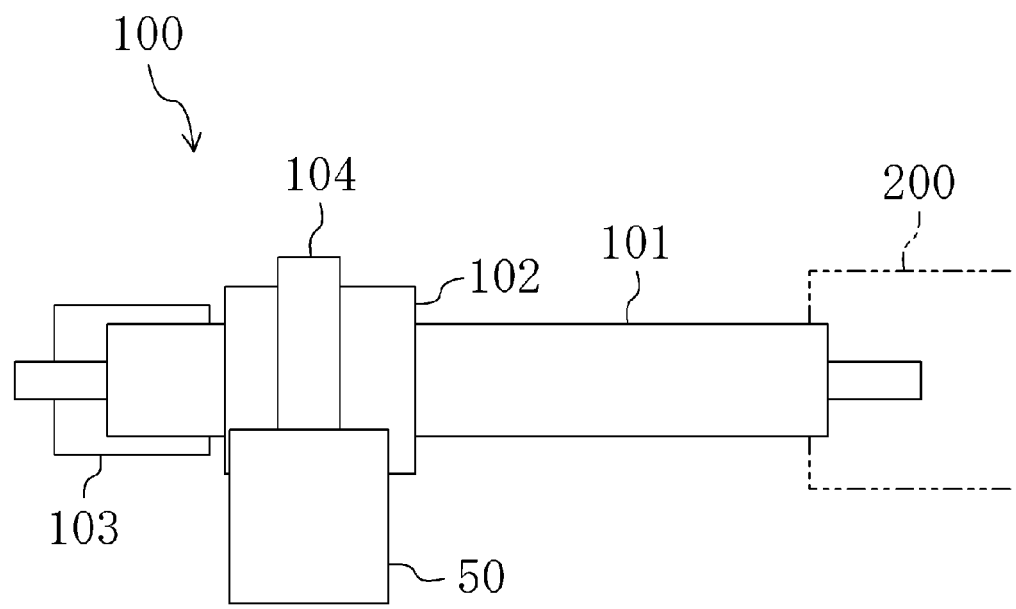
FIG. 1 is a schematic view of a power steering apparatus according to a preferred embodiment of the present invention.

FIG. 1 is a schematic diagram of an electric power steering apparatus 100 according to a preferred embodiment of the present invention. The power steering apparatus 100 is preferably used to assist a driver of a vehicle, such as an automobile, in handling a steering wheel thereof. The power steering apparatus 100 preferably includes a torque sensor 102, which is arranged to detect a force applied to the steering wheel via a shaft portion 101 connected to a steering mechanism 200; a control unit 103, which is arranged to calculate a required assistive force based on a detection signal supplied from the torque sensor 102; a motor 50, which is arranged to produce a rotational force in response to a drive signal supplied by the control unit 103; and a deceleration mechanism 104, which is arranged to transfer the turning force of the motor 50 to the steering mechanism 200.

The motor 50 of the power steering apparatus 100 is preferably arranged to be driven based on an amount of force applied to a steering wheel in a vehicle in which the power steering apparatus 100 is mounted. The turning force of the motor 50 is used to aid the rotation of the steering wheel. This enables the driver of the vehicle to operate the steering wheel with less force than would be required to handle a steering wheel of a vehicle without a power steering apparatus.

Figure 2:
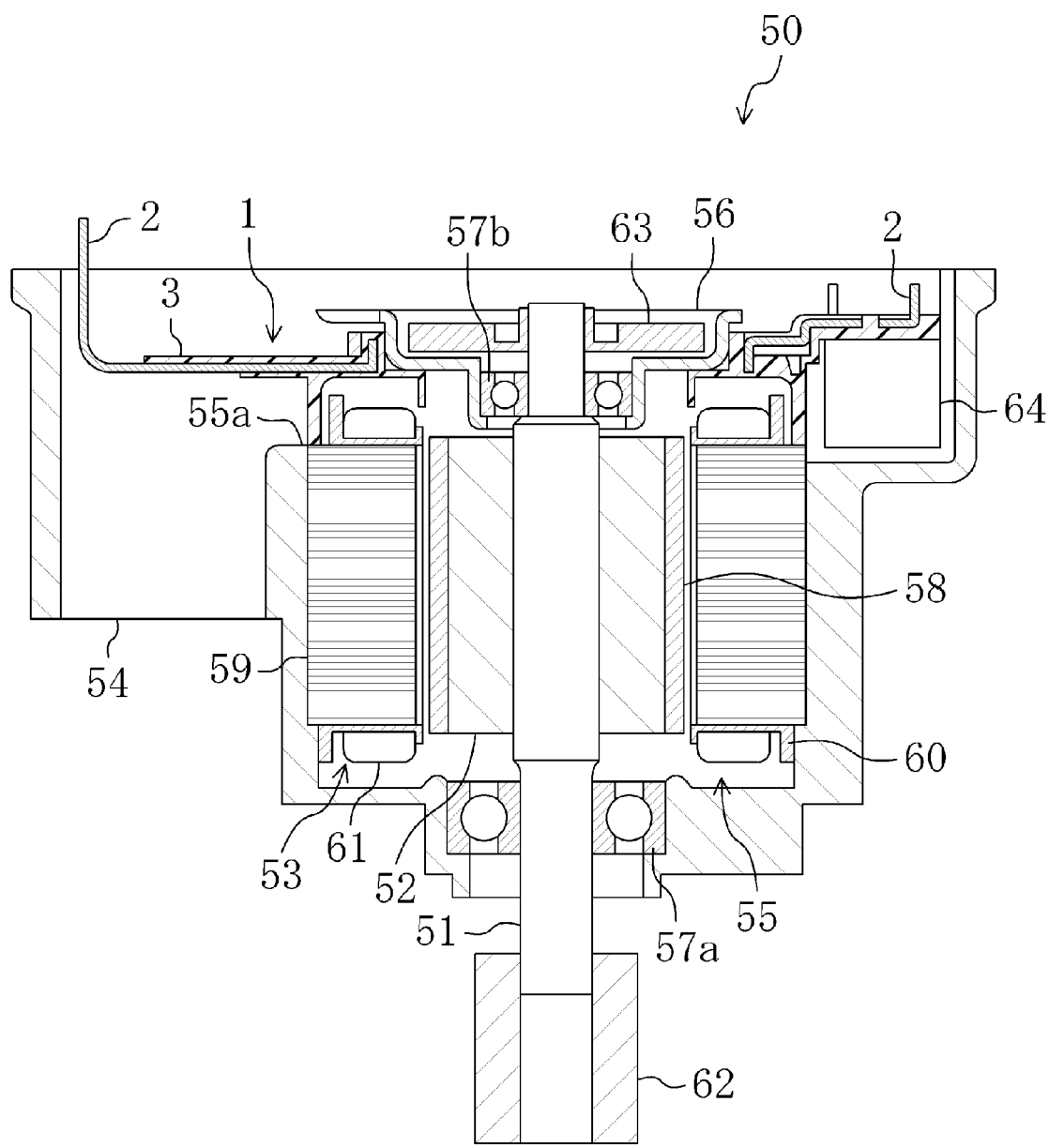
FIG. 2 is a schematic cross-sectional view of a motor according to a preferred embodiment of the present invention.

FIG. 2 is a schematic view of the motor 50 provided in the power steering apparatus 100 according to a preferred embodiment of the present invention. This motor 50 is preferably an inner rotor-type motor which preferably includes the shaft 51, a rotor 52, a stator 53, a motor housing 54, a busbar unit 1, and so on.

The motor housing 54 preferably includes an opening portion 55a and a motor chamber 55. The motor chamber 55 is substantially in the shape of a cylinder with a bottom, and is formed continuously with the opening portion 55a. The stator 53, which is substantially in the shape of a cylinder, is arranged in the motor chamber 55 of the motor housing 54. The rotor 52, which is substantially in the shape of a cylinder, is arranged inside an inner circumferential surface of the stator 53 with a slight gap therebetween. The rotor 52 is fixed to the shaft 51. The busbar unit 1 is placed in the opening portion 55a of the motor housing 54. A bearing holder 56 is preferably arranged such that the bearing holder 56 and the stator 53 combine to sandwich the busbar unit 1 between the bearing holder 56 and the stator 53 along the axial direction of the shaft 51. On a top end side, the shaft 51 is rotatably supported by the motor housing 54 via a bearing 57a. On a base end side, the shaft 51 is rotatably supported by the bearing holder 56 via a bearing 57b.

A plurality of rotor magnets 58 are preferably arranged on the rotor 52. The stator 53 preferably includes a core 59, an insulator 60, a plurality of coils 61, and so on. The insulator 60 is made of an insulating material and attached to the core 59. Each coil 61 is defined by winding a conductive wire around the core 59 with the insulator 60 therebetween. A pulley 62, which is arranged to be connected to the deceleration mechanism 104, is preferably fixed to a top end of the shaft 51. A sensor apparatus 63, which is arranged to measure a rotation angle and speed of the shaft 51, is fixed to a base end portion of the shaft 51 and surrounded by the bearing holder 56. The busbar unit 1 preferably includes a plurality of busbars 2, a relay 64, and so on. The relay 64 is designed to control a current to be supplied to the busbars 2.

Figure 3:
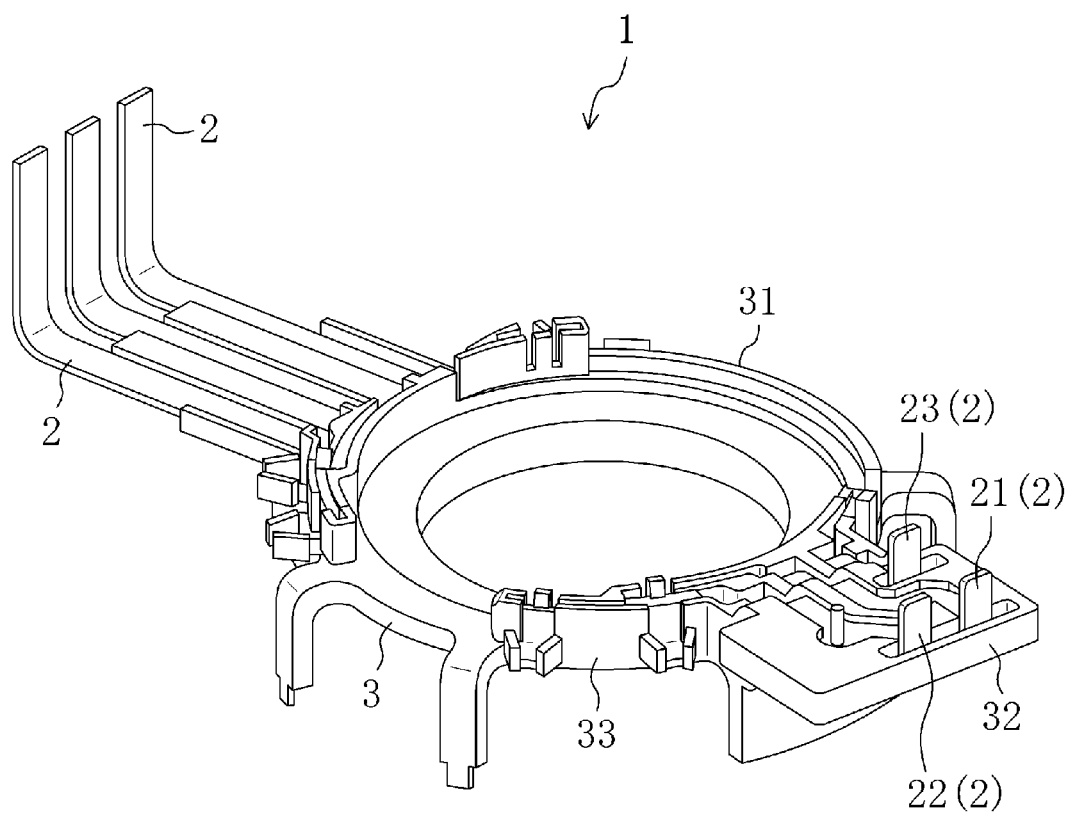
FIG. 3 is a schematic perspective view of a busbar unit according to a preferred embodiment of the present invention.

FIG. 3 is a schematic external view of the busbar unit 1 according to a preferred embodiment of the present invention. The busbar unit 1 is an assembly preferably including the busbars 2 and supporting elements arranged to fit in a holder 3.

Figure 4:
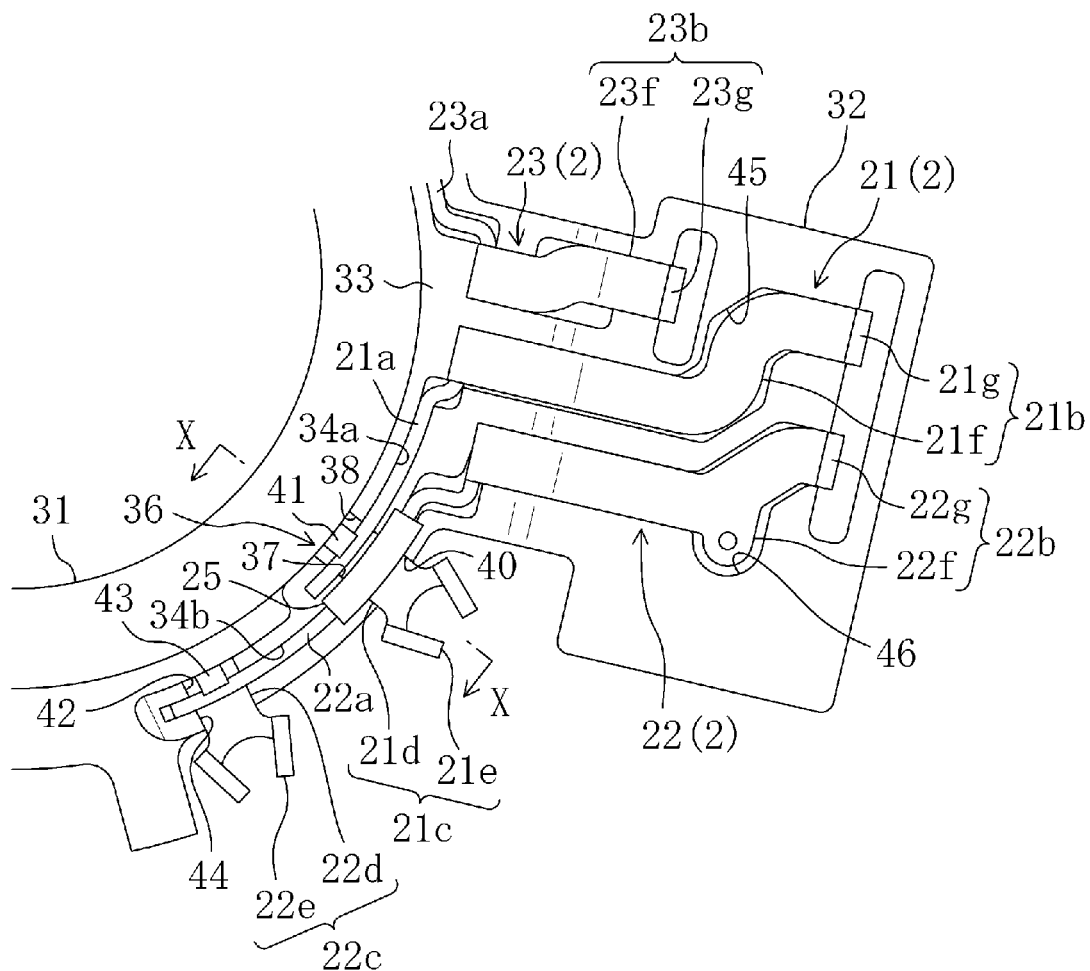
FIG. 4 is an enlarged view of a portion of the busbar unit according to a preferred embodiment of the present invention.
Figure 5:
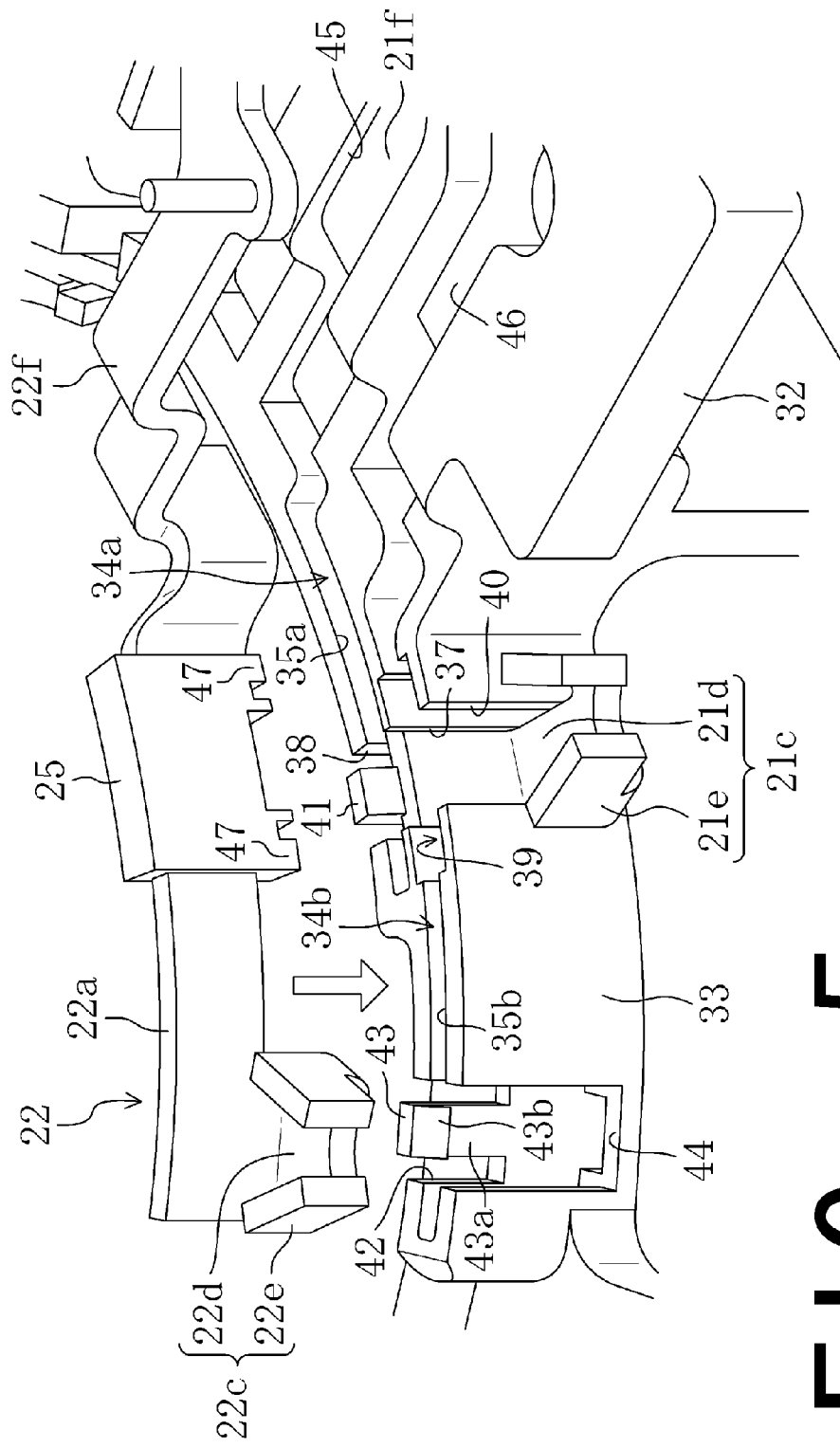
FIG. 5 is a schematic view illustrating how a busbar is inserted into a holder during a process of attaching busbars according to a preferred embodiment of the present invention.

As illustrated in detail in FIGS. 4 and 5, each of the busbars 2 is an electrically conductive member defined by an electrically conductive plate (preferably copper, for example) or the like which has been cut and bent to assume a predetermined desired shape. Each busbar 2 is arranged to be connected to an end portion of one or more of the conductive wires drawn from the coils 61 of the stator 53. The coils 61 of the stator 53 are connected to a power supply external to the motor 50 through the busbars 2, so that electrical currents are supplied in three phases (e.g., U, V, and W phases) to each coil 61 in a predetermined arrangement.

For example, as illustrated in FIG. 4, three busbars 2 (hereinafter referred to also as a first busbar 21, a second busbar 22, and a third busbar 23) are provided, as the electrical currents are supplied in three phases.

Each busbar 2 is different in shape but has a similar structure. For example, the first busbar 21 includes a first insert portion 21a, a first connection portion 21b, and a first terminal portion 21c. The first insert portion 21a is defined by a substantially plate-shaped portion which is bent to be substantially in the shape of a circular arc. The first connection portion 21b is continuous with one end portion (hereinafter referred to as "a near end portion" as appropriate) of the first insert portion 21a. The first terminal portion 21c is continuous with an opposite end portion (hereinafter referred to as "a far end portion" as appropriate) of the first insert portion 21a. The first terminal portion 21c preferably includes a first terminal arm portion 21d and first conductive wire fixing portions 21e. The first terminal arm portion 21d extends radially outward from the far end portion of the first insert portion 21a in a direction substantially perpendicular to the axial direction. The first conductive wire fixing portions 21e are provided at a top of the first terminal arm portion 21d. The first connection portion 21b preferably includes a first connection arm portion 21f and a first connection terminal portion 21g. The first connection arm portion 21f extends radially outward, in a stepwise manner, from the near end portion of the first insert portion 21a in a direction substantially perpendicular to the axial direction. The first connection terminal portion 21g is provided at a top of the first connection arm portion 21f.

The second busbar 22 has a similar structure to that of the first busbar 21, and includes a second insert portion 22a, a second connection portion 22b, a second terminal portion 22c, a second terminal arm portion 22d, a second conductive wire fixing portion 22e, a second connection arm portion 22f, and a second connection terminal portion 22g. Similarly, the third busbar 23 includes a third insert portion 23a, a third connection portion 23b, a third terminal portion (not shown), a third terminal arm portion (not shown), a third conductive wire fixing portion (not shown), a third connection arm portion 23f, and a third connection terminal portion 23g.

Notice, however, that an insulating member 25 is provided on the second insert portion 22a of the second busbar 22. In the present preferred embodiment, the insulating member is preferably made of the same material as that of the holder 3, and arranged to cover a circumference of the second insert portion 22a. With respect to a longitudinal direction of the second insert portion 22a, the insulating member 25 is arranged to extend over only that portion of the second insert portion which is directly opposed to the first busbar 21 with a gap therebetween and its surroundings. The insulating member 25 may be arranged integrally with the second busbar 22 by so-called outsert molding, for example. A pair of projection portions 47 is defined at a lower end of the insulating member 25, which will be described below.

The insulating member 25 and the holder 3 are preferably made of the same material so that they are the same in properties such as a thermal contraction coefficient. This contributes to preventing a difference in temperature between the insulating member 25 and the holder 3 from causing a gap therebetween or causing a difference in durability therebetween, for example. When the insulating member 25 is arranged integrally with the second busbar 22, the need to position the insulating member 25 is eliminated thereby improving workability, for example. When the insulating member 25 is arranged to cover only a portion of the second busbar 22, the cost of the material or the like is reduced, for example.

The holder 3 is preferably an injection molded article made of an insulating material such as polybutylene terephthalate (PBT) containing a fiber, for example. The holder 3 preferably includes a substantially ring-shaped base portion 31, which is attached to the opening portion 55a of the motor housing 54; and a connector portion 32 arranged to provide a connection to the external power supply. The base portion 31 preferably includes a busbar support wall 33 substantially in the shape of a circular arc. The connector portion 32 is preferably arranged radially outward of and arranged integrally with the busbar support wall 33.

A plurality of groove portions 34a and 34b are provided in the busbar support wall 33 to receive the first, second, and third insert portions 21a, 22a, and 23a. The groove portions 34a and 34b are arranged to extend substantially in the circumferential direction and have a width slightly greater than the dimension substantially in the radial direction of the first, second, and third insert portions 21a, 22a, and 23a of the busbars 2. For example, a first groove portion 34a, which is arranged to receive the first busbar 21, and a second groove portion 34b, which is arranged to receive the second busbar 22, include a first opening portion 35a and a second opening portion 35b, respectively, which open into an outside surface (i.e., a surface that faces outward when the busbar unit 1 is fit on the motor housing 54) of the base portion 31. The first and second busbars 21 and 22 can be inserted into the first and second groove portions 34a and 34b through the first and second opening portions 35a and 35b, respectively. The first and second groove portions 34a and 34b are preferably arranged adjacent to each other. The first groove portion 34a is arranged substantially radially inward of the second groove portion 34b. Moreover, with respect to substantially the circumferential direction, the distance of a far end of the second groove portion 34b from a near end (i.e., an end the closer to the connector portion 32) of the first groove portion 34a is greater than the distance of a far end of the first groove portion 34a from the near end of the first groove portion 34a. A far end portion of the first groove portion 34a overlaps with the second groove portion 34b in the radial direction. This portion where the first and second groove portions 34a and 34b overlap with each other will be referred to also as an overlap portion 36.

At the overlap portion 36, an intersecting groove portion 37, which extends in the radial direction between the first and second groove portions 34a and 34b to be continuous with the first and second groove portions 34a and 34b, is provided in the busbar support wall 33 to receive the first terminal arm portion 21d of the first busbar 21. On an opposite side of the first groove portion 34a relative to the intersecting groove portion 37, i.e., in a wall radially inward of the first groove portion 34a (i.e., arranged closer to the shaft 51 in the radial direction) and defining the first groove portion 34a, a first inner groove portion 38, which passes through the busbar support wall 33, is provided to be opposed to the intersecting groove portion 37. That portion of the overlap portion 36 which corresponds to the second groove portion 34b preferably has a greater width than those portions of the second groove portion 34b which do not receive the insulating member 25, in order to receive the insulating member 25 (this increased width portion will be referred to also as a receiving groove portion 39). It is preferable that the internal dimensions of the receiving groove portion 39 be slightly smaller than the external dimensions of the insulating member 25 in order to allow press fitting of the insulating member 25. This will contribute to retaining the second busbar 22 stably in the busbar support wall 33.

On an opposite side of the second groove portion 34b relative to the intersecting groove portion 37, i.e., in a wall radially outward of the second groove portion 34b and defining the second groove portion 34b, a first terminal groove portion 40, which passes through the busbar support wall 33 and is arranged to receive the first terminal arm portion 21d, is arranged to be opposed to the intersecting groove portion 37.

Figure 6:
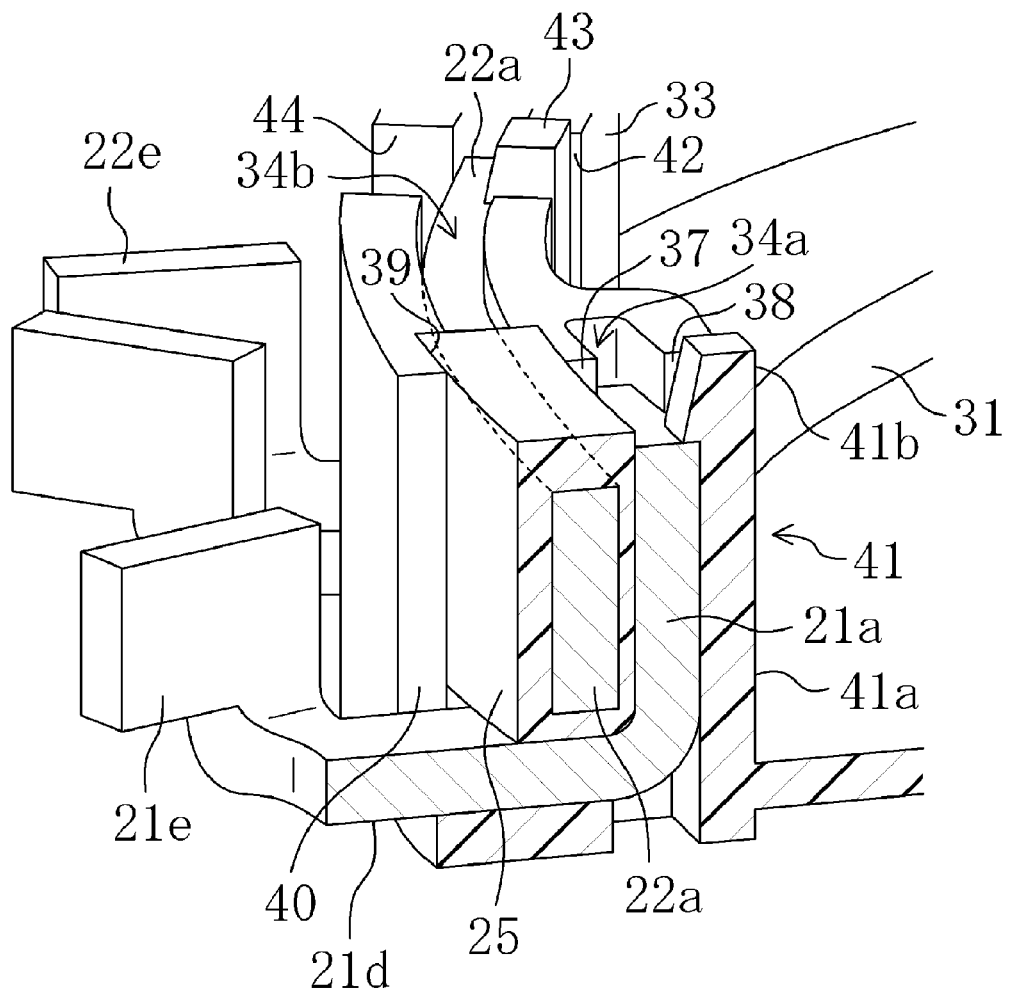
FIG. 6 is a schematic cross-sectional view of the busbar unit taken along line X-X of FIG. 4.

As also illustrated in FIG. 6, a first support member (i.e., a slip-off preventing portion) is provided within the first inner groove portion 38 to prevent the first busbar 21 from slipping off the first groove portion 34a. In more detail, the first support member 41 preferably includes a flexible shank portion 41a, which extends upward from a bottom surface of the first inner groove portion 38, and a claw portion 41b, which is preferably provided on top of the shank portion 41a and arranged to protrude in the direction of the first groove portion 34a. Note that the first support member 41 is provided within the first inner groove portion 38 because it is easy to form the first support member 41 therein by injection molding together with the intersecting groove portion 37 and the first terminal groove portion 40. Moreover, a through hole having slightly greater dimensions than those of the claw portion 41b is arranged in a bottom portion of the first inner groove portion 38 to facilitate the formation of the claw portion 41b by, for example, injection molding.

In a wall located radially inward of an end portion of the second groove portion 34b farthest away from the connector portion 32, a second inner groove portion 42 is arranged to pass through the busbar support wall 33. A second support member 43, which is similar to the first support member 41, and a through hole are provided in the second inner groove portion 42. In addition, in a wall radially outward thereof, a second terminal groove portion 44, which passes through the busbar support wall and is arranged to receive the second terminal arm portion 22d, is arranged to be opposed to the second inner groove portion 42.

A first connector groove portion 45, which extends continuously with the first groove portion 34a, is provided in the connector portion 32 to receive the first connection arm portion 21f. Similarly, a second connector groove portion 46, which extends continuously with the second groove portion 34b, is provided in the connector portion 32 to receive the second connection arm portion 22f of the second busbar 22.

In the present preferred embodiment, the first busbar is first fit into the holder 3. Specifically, the first insert portion 21a is inserted into the first groove portion 34a, starting with an end thereof on the first terminal arm portion 21d side. When the first terminal arm portion 21d is fit into the intersecting groove portion 37 and the first terminal groove portion 40, the first connection arm portion 21f is fit into the first connector groove portion 45 at the same time. Once the first busbar 21 is pressed into a bottom of the first groove portion 34a, the claw portion 41b of the first support member 41 protrudes in the direction of the first busbar 21 to be in engagement with an upper surface of the first insert portion 21a, which faces in the same direction as the opening of the groove portion. Thus, the first support member 41 positions and supports the first busbar 21 to prevent the slipping off of the first busbar 21.

Next, as illustrated in FIG. 5, the second insert portion 22a of the second busbar 22 is inserted into the second groove portion 34b, starting with an end thereof on the second terminal arm portion 22d side. The second terminal arm portion 22d is fit into the second terminal groove portion 44, the insulating member 25 and a corresponding portion of the second insert portion 22a are fit into the receiving groove portion 39, the second connection arm portion 22f is fit into the second connector groove portion 46, and the second busbar 22 is pressed into a bottom of the second groove portion 34b. As a result, the claw portion 43b of the second support member 43 protrudes in the direction of the second busbar 22 to be in engagement with an upper surface of the second insert portion 22a, which faces in the same direction as the opening of the groove portion. Thus, the second support member 43 positions and supports the second busbar 22 to prevent the slipping off of the second busbar 22. Note that, when it is so arranged that the busbars 21 and 22 are supported by the support members 41 and 43 through a snap-fitting arrangement, assembly of the busbar unit 1 is easy and workability is thereby improved. Also note that the support members 41 and 43 (i.e., the slip-off preventing portions) are provided at circumferential positions corresponding to the first and second terminal arm portions 21d and 22d, respectively. Thus, a stress which is applied to each of the terminal arm portions 21d and 22d when the conductive wires drawn from the coils 61 are connected to each of the busbars 2 contributes to efficiently preventing the busbars 2 from slipping off the groove portions 34a and 34b.

As illustrated in FIG. 6, when the first and second busbars 21 and 22 have been fit into the predetermined positions of the busbar support wall 33, the first terminal arm portion 21d extends below and across the second insert portion 22a. There is only a slight gap between an upper surface of the first terminal arm portion 21d, which faces in the same direction as the opening of the groove portion, and an opposed lower surface of the second insert portion 22a, and between a radially outer surface of that portion of the first insert portion 21a which is continuous with the first terminal arm portion 21d and an opposed radially inner surface of the second insert portion 22a. However, portions of the insulating member 25 fill these gaps, and this contributes to preventing spark discharge or short circuiting between the first and second busbars 21 and 22.

Figure 7:
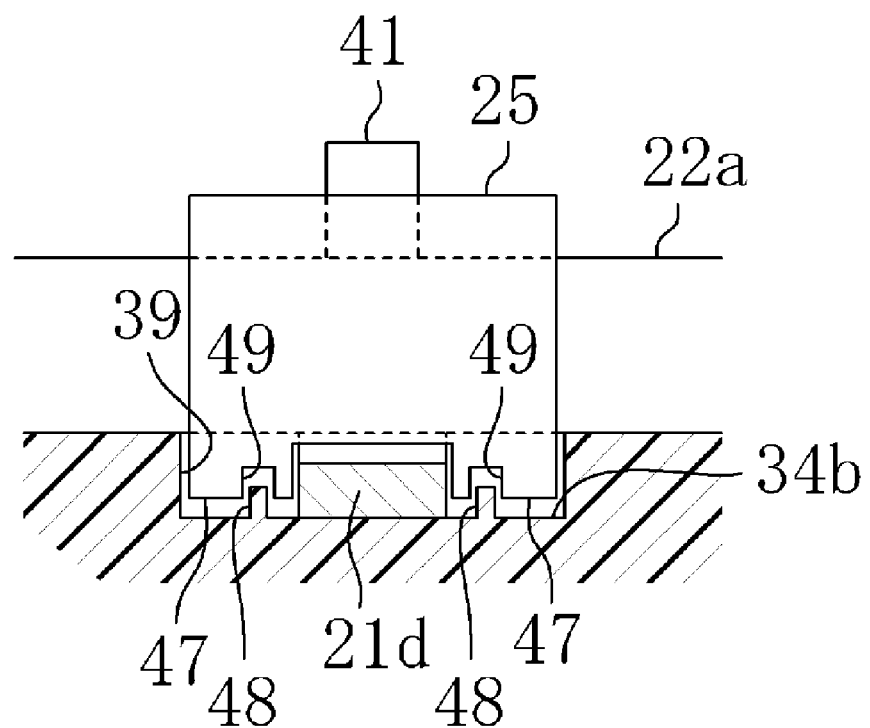
FIG. 7 is a schematic view illustrating how an insulating member is arranged in a groove portion of the holder according to a preferred embodiment of the present invention.

As illustrated in FIG. 7, the lower end of the insulating member 25, i.e., that end of the insulating member 25 which is fit into the receiving groove portion 39, has provided thereon the pair of projection portions 47, which are laterally spaced from each other. When the insulating member 25 has been fit into the receiving groove portion 39, the projection portions 47 protrude on either side of the first terminal arm portion 21d to cover side surfaces of the first terminal arm portion 21d. The provision of the projection portions 47 in the insulating member 25 contributes to improving accuracy in positioning the second busbar 22 in the circumferential direction.

If an electrically conductive extraneous material, such as, for example, a metal powder, enters into a gap between the first terminal arm portion 21d and the insulating member 25, the spark discharge or the short circuit may occur, through the extraneous material, between the first terminal arm portion 21d and those portions of the second insert portion 22a which are on either side of the insulating member 25. However, the provision of the projection portions 47 contributes to preventing the intrusion of the extraneous material, resulting in an additional improvement in insulation.

Moreover, in the present preferred embodiment, a pair of wall-shaped raised portions 48, both of which extend in a width direction of the groove, protrudes from a bottom surface of the receiving groove portion 39 in the direction of the opening of the groove portion. A recessed portion 49, which is recessed in the direction of the opening of the second groove portion 34b, is provided in each of the projection portions 47 to receive a top of a corresponding one of the raised portions 48. The provision of the raised portions 48 and the recessed portions 49 contributes to preventing the intrusion of the extraneous material more effectively, resulting in improved insulation.

Figure 8:
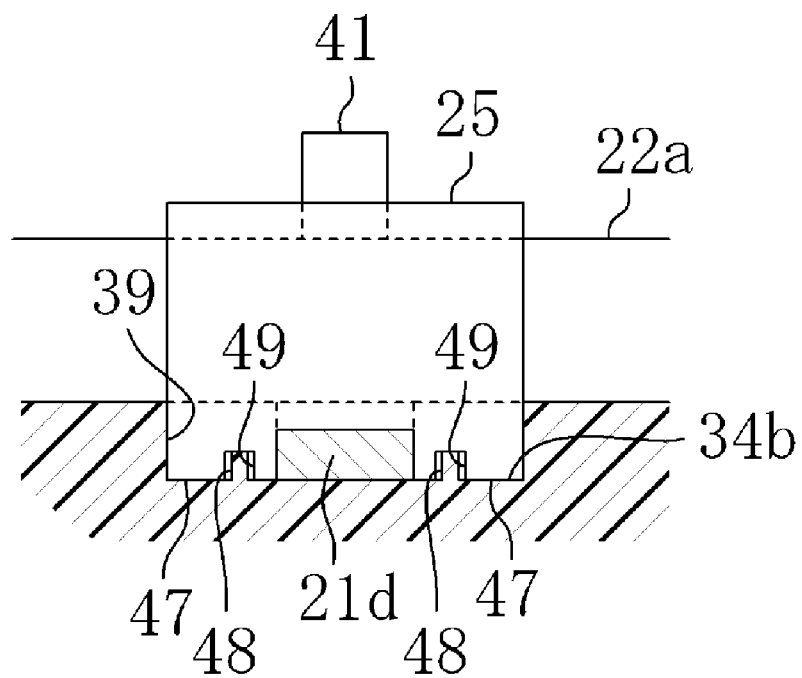
FIG. 8 is a schematic view illustrating a variation of how the insulating member is arranged in the groove portion of the holder in accordance with a preferred embodiment of the present invention.

Furthermore, as illustrated in FIG. 8, press-fitting the insulating member 25 into the receiving groove portion 39 will contribute to further improving the accuracy in positioning the busbar 22 substantially in the circumferential direction, and preventing the intrusion of the extraneous material.

Note that the present invention is not limited to the busbar unit 1 and so on according to the above-described preferred embodiments, and that variations and modifications can be made without departing from the scope and spirit of the present invention.

FIGS. 9A, 9B, 9C, and 9D are schematic views of exemplary variations of the insulating member 25.

Figure 9A:
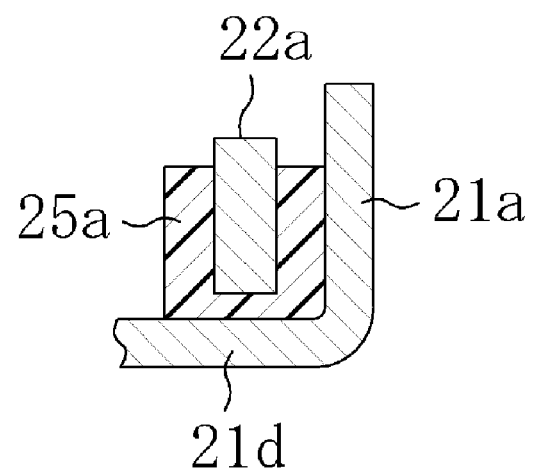
FIGS. 9A, 9B, 9C, and 9D are schematic views of insulating members according to preferred embodiments of the present invention.

The insulating member 25 (a second insulating member 25a) as illustrated in FIG. 9A is preferably separate and independent from the second busbar 22. The second insulating member 25a preferably is a rectangular or substantially rectangular member with a substantially U-shaped cross-section, and includes on one end thereof a groove arranged to receive the second insert portion 22a. For example, after the first busbar 21 is fit into the busbar support wall 33, the second insulating member 25a is inserted into the receiving groove portion 39 with an opening of the second insulating member 25a facing upward, and thereafter the second busbar 22 is fit thereinto.

In this manner, the second insulating member 25a can be arranged in the gap between the first and second busbars 21 and 22 at least where the first and second busbars 21 and 22 intersect with each other, to prevent the first and second busbars 21 and 22 from coming too close to each other, resulting in improved insulation.

Figure 9B:
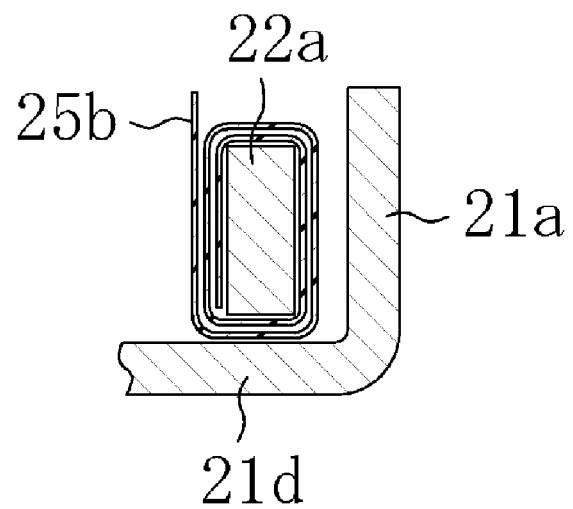

The insulating member 25 (a third insulating member 25b) as illustrated in FIG. 9B is arranged substantially in the shape of a sheet, and can be wound about the second busbar 22 as appropriate. In this case, the third insulating member 25b is wound about that portion of the second busbar 22 which is axially opposed to the first terminal arm portion of the first busbar, and the second busbar 22 with the third insulating member 25b wound thereabout is fit into the busbar support wall 33. In this manner also, an improvement in insulation can be achieved as in the above-described preferred embodiment.

Figure 9C:
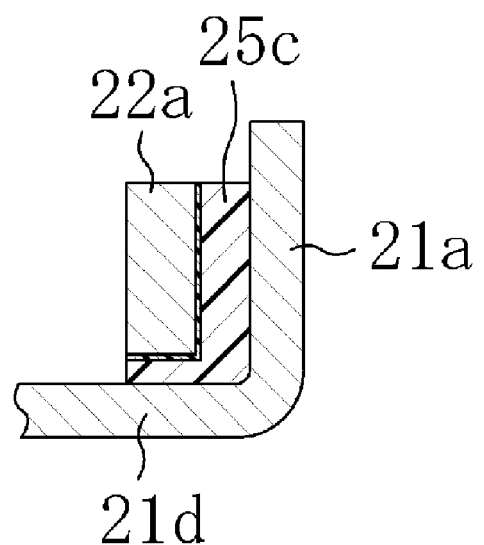

The insulating member 25 (a fourth insulating member 25c) as illustrated in FIG. 9C preferably is a rectangular or substantially rectangular member with a substantially L-shaped cross-section. The fourth insulating member 25c is adhered to a predetermined portion of the second busbar 22 so that the fourth insulating member 25c will be arranged at a predetermined position between the first and second busbars 21 and 22 when they have been fit into the busbar support wall 33. In this case also, an improvement in insulation can be achieved as in the above-described preferred embodiment.

Figure 9D:
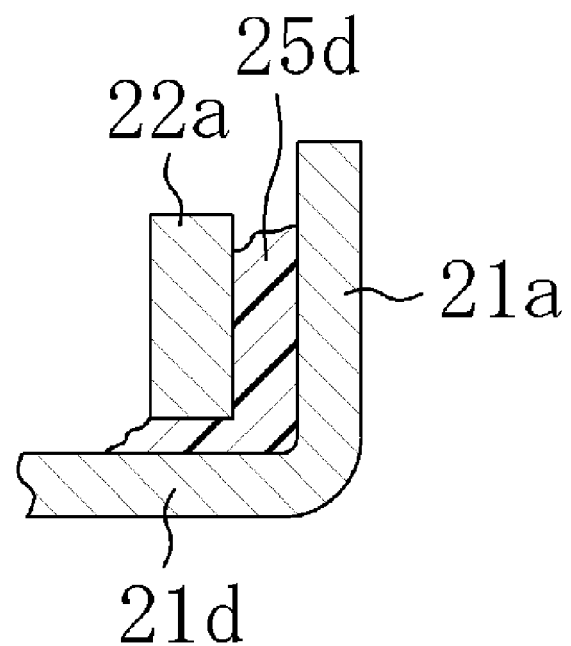

The insulating member 25 (a fifth insulating member 25d) as illustrated in FIG. 9D preferably is a liquid or gelatinous insulating member which is irreversibly solidified. In this case, after the first and second busbars 21 and 22 are fit into the busbar support wall 33, the fifth insulating member 25d is injected into the gap therebetween and solidified. In this manner also, an improvement in insulation can be achieved as in the above-described preferred embodiment.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A busbar unit comprising:
a plurality of busbars including at least a first busbar and a second busbar;
an insulating holder in which each of the plurality of busbars is arranged; and
an insulating member; wherein
the holder includes a first groove portion including a first opening portion arranged to receive the first busbar, and a second groove portion arranged adjacent to the first groove portion and including a second opening portion arranged to receive the second busbar;
the first busbar includes a first terminal arm portion arranged to extend across the second busbar, and the insulating member is arranged between the first terminal arm portion and the second busbar; and
the insulating member is arranged within a portion of the second groove portion that has a greater thickness than thicknesses of remaining portions of the second groove portion; and an inner groove portion arranged on an opposite side of the first groove portion relative to the intersecting groove portion to be opposed to the intersecting groove portion; and a first slip-off preventing portion arranged within the inner groove portion and including: a flexible shank portion extending upward from a bottom surface of the inner groove portion; and a claw portion arranged on top of the shank portion, a portion of the claw portion being arranged to protrude in a direction corresponding to the second groove portion.

2. The busbar unit according to claim 1, further comprising:
an intersecting groove portion arranged between the first groove portion and the second groove portion of the holder to receive the first terminal arm portion; wherein
the first and second opening portions are defined on a common outside surface of the holder; and
the first terminal arm portion is arranged between the intersecting groove portion and the second busbar.

3. The busbar unit according to claim 1, wherein
the second busbar includes a second terminal arm portion;
the busbar unit includes a second slip-off preventing portion arranged at a circumferential position corresponding to the second terminal arm portion; and
the first slip-off preventing portion is arranged at a circumferential position corresponding to the first terminal arm portion.

4. The busbar unit according to claim 1, wherein the insulating member includes a pair of projection portions arranged to protrude in a direction of the first terminal arm portion, and the first terminal arm portion is arranged between the pair of projection portions.

5. The busbar unit according to claim 4, wherein
at least one of the projection portions includes a recessed portion recessed in a direction extending away from the first terminal arm portion; and
the second groove portion includes a raised portion arranged at a position corresponding to the recessed portion.

6. The busbar unit according to claim 1, wherein the insulating member is integral with the portion of the second busbar which is arranged opposite to the first terminal arm portion.

7. The busbar unit according to claim 1, wherein the insulating member and the holder are made of the same material.

8. The busbar unit according to claim 7, wherein the insulating member includes a substantially U-shaped cross-section.

9. The busbar unit according to claim 1, wherein the insulating member is substantially in the shape of a sheet and is wound about the second busbar.

10. The busbar unit according to claim 7, wherein the insulating member includes a substantially L-shaped cross-section.

11. The busbar unit according to claim 1, wherein the insulating member is made of a solidified liquid or gelatinous insulating material.

12. A motor comprising the busbar unit of claim 2.

13. A power steering apparatus comprising the motor of claim 12.

14. A motor comprising the busbar unit of claim 4.

15. A power steering apparatus comprising the motor of claim 14.

16. A busbar unit comprising:
a plurality of busbars including at least a first busbar and a second busbar;
an insulating holder in which each of the plurality of busbars is arranged; and
an insulating member; wherein
the holder includes a first groove portion including a first opening portion arranged to receive the first busbar, and a second groove portion arranged adjacent to the first groove portion and including a second opening portion arrangdd to receive the second busbar;
the first busbar includes a first terminal arm portion arranged to extend across the second busbar, and the insulating member is arranged between the first terminal arm portion and the second busbar; and
the insulating member is arranged within a portion of the second groove portion that has a greater width than widths of remaining portions of the second groove portion; and an inner groove portion arranged on an opposite side of the first groove portion relative to the intersecting groove portion to be opposed to the intersecting groove portion; and a first slip-off preventing portion arranged within the inner groove portion and including: a flexible shank portion extending upward from a bottom surface of the inner groove portion; and a claw portion arranged on top of the shank portion, a portion of the claw portion being arranged to protrude in a direction corresponding to the second groove portion.

* * * * *